Jan. 22, 1929.
P. MEYER
1,699,668
VALVE
Filed Jan. 26, 1928
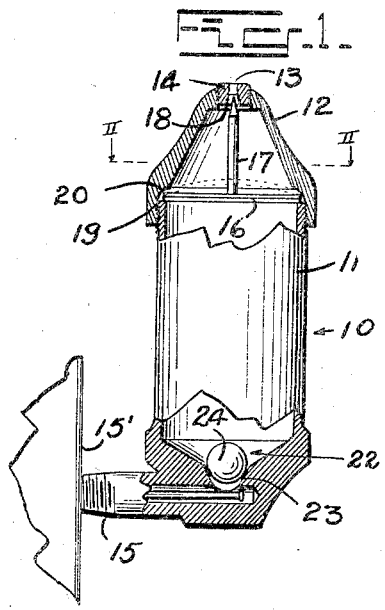
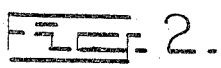
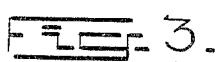
INVENTOR
P. MEYER
BY Greenbower Reges
ATTORNEYS Patented Jan. 22, 1929.

1,699,668

UNITED STATES PATENT OFFICE.

PETER MEYER, OF NEWARK, NEW JERSEY, ASSIGNOR TO KING VALVE ATTACHMENT CORPORATION, OF BROOKLYN, NEW YORK.

VALVE.

Application filed January 26, 1928. Serial No. 249,507.

This invention relates to an improvement in valves and more particularly to what are commonly known as radiator relief valves.

The use of an automatic relief valve on steam radiators in domestic use is desirable since it is essential to provide a means of permitting the escape of air from a steam system to avoid retarding the flow of steam to the radiator for heat radiating purposes.

Heretofore various types of valves were made intending to function so as to permit the escape of air and to then prevent the escape of steam as is required.

Valves for the above purpose as heretofore constructed, involved complicated mechanisms which were subject to mechanical defects and unless made with exceeding care and at high cost, were soon defective and acted either to leave the provided outlet port continually open or closed.

It is to be understood that a valve of the present type has its primary use in connection with the radiators in dwellings where skilled attention is lacking and the valve must therefore be of simple construction and since a plurality of valves are usually required for each dwelling the factor of cost is important.

An object of the present invention is therefore, to provide a valve of simple construction and capable of production at a relatively low cost.

Another object of the invention is to provide a radiator valve which will be responsive to temperature conditions and which will operate in accordance with variations in temperature.

Another object of the invention is to provide a valve having a unitary valve closing member free from movable elements.

Other objects and advantages of the invention will be understood as the description proceeds.

Briefly the invention includes a casing adapted to constitute part of the heating element as, for example, a radiator. Within the casing is provided a strip of material responsive to temperature conditions. The said strip may be of bi-metallic or other heat responsive material and a stem or valve is directly associated therewith. The stem is arranged to engage a valve seat or port to close the casing from the atmosphere and to lift the port to open the casing to the atmosphere in such manner as to permit the escape of air and prevent the escape of steam.

The entire valve structure is embodied in a unitary control member comprising a bi-metallic strip and a stem which acts to effectively control an outlet port, reducing to a minimum the possibility of the valve becoming inoperative.

The invention will be more fully understood by reference to the accompanying drawing in which:

Fig. 1 is a side view partly in section of a valve embodying the present invention;

Fig. 2 is a view taken in line II—II in Fig. 1; and,

Fig. 3 is a fragmentary view of a portion of a modified form of the valve.

Although the present invention is shown applied to a tubular casing or cylindrical type of valve of a shape commonly used, it is to be understood that the said valve may be embodied in a casing of any suitable form.

As shown, a practical embodiment of the invention may comprise a casing 10 consisting of a body portion 11 and a cap 12. The top or cap 12 of the casing is provided with an outlet port 13 which may be formed directly in the cap or in an adjustable bushing or plug 14. By means of the plug 14 the position of the outlet 13 may be changed along the axis of the casing. The lower end of the casing may be provided with the usual nipple 15 for attachment to and communication with a radiator 15'.

The present invention provides means for controlling the outlet port 13 and includes a strip 16 of heat responsive material. Any suitable material that will distort upon being subjected to temperature changes will suffice. It has been found that satisfactory results are obtained by the use of a thermostatic element such as a strip comprised of two layers of metal of different coefficients of expansion as, for example, one layer may be of brass and the other of an alloy of an exceedingly low coefficient of expansion. Such elements known as bi-metallic sheets or strips are well known and although any combination of metals or other materials may be used, the strip 16 will hereinafter be termed a thermostatic element.

The said thermostatic element is provided with a stem or valve 17 which is fastened at one end to the strip 16 and tapered at its opposite end to engage with a seat 18 in the outlet 13 to close the same or be moved away to open the outlet.

The movement of the stem 17 is attained by reason of the thermostatic element to which it is attached. The said strip being arranged to flex upwardly as shown in dotted lines when heated by the flow of steam into the casing 10. The said strip may be held in any suitable manner and as shown, rests upon the edge 19 of the body 11 and is confined by an inclined or rounded shoulder 20 in the cap 12.

The present construction, although simple, gives an effective and positive operation, the strip 16 acting to raise the stem, moves the same to close the valve and at the same time the strip is placed under tension which builds up within the strip resulting in a more gradual removal of the stem from its seat when the strip cools. This delayed action of the thermostatic control permits an auxiliary pressure valve 22 to operate and close the inlet through the nipple 15. The said pressure valve 22 may be located in any suitable position and as shown, may comprise a seat 23 and a ball 24.

Although the thermostatic element as shown in Fig. 1 may operate to move the stem upwardly to close the port 13, it is obvious that the same result may be obtained by a construction as shown in Fig. 3. In this view a strip 25 is provided with a stem 26 having a conical valve member 27 adapted to be moved onto or off from a seat 28, the action of the thermostatic strip being downward or opposite to that shown in Fig. 1.

In operation, the thermostatic control of the present valve will cause the outlet 13 to be open when the radiator is cold and the pressure valve 22 will close the radiator to prevent the entrance of air. When steam enters the radiator the pressure thereof will raise the ball 24 and the steam will enter the casing 10 at which time such air as may be in the casing will escape through the outlet 13 and the heat of the steam will be transferred to the strip 16, causing the same to close the outlet 13. Thus the pressure may rise with an increase in the degree of heat which tends to more firmly press the stem against its seat to prevent the outlet of steam.

Upon a fall in the steam pressure the ball 22 will immediately close the communication between the radiator and the casing and upon a cooling of the strip 16 the same will flex to open the outlet 13.

The present invention provides a cheaply constructed means of controlling an outlet port and although the present thermostatic element is in the form of a strip it is evident that the same may be of a different shape. For example, the thermostatic element may be of cross or star shape or in the form of a disc. The present invention, however, contemplates the above and other modifications as come within the scope of the invention as set forth in the appended claims.

What is claimed is:

1. A device of the class described comprising a casing, a cap having an orifice, a bi-metallic strip disposed upon one end of said casing, a shoulder within said cap for holding said strip in position, and a member movable with said strip and arranged to close or open said orifice upon a flexure of said strip upon variations in temperature.

2. A device of the class described comprising a casing, a cap having an orifice, a bi-metallic strip disposed upon one end of said casing, a shoulder within said cap for holding said strip in position, and a member movable with said strip and arranged to close or open said orifice upon a flexure of said strip upon variations in temperature, a passage at one end of said casing and a pressure valve for controlling said passage.

In testimony whereof I affix my signature.

PETER MEYER.